US008915704B2

(12) United States Patent
Severin et al.

(10) Patent No.: US 8,915,704 B2
(45) Date of Patent: Dec. 23, 2014

(54) TURBOCHARGER VARIABLE-NOZZLE ASSEMBLY WITH VANE SEALING RING

(75) Inventors: Emmanuel Severin, Thaon les Vosges (FR); Pierre Barthelet, Thaon les Vosges (FR)

(73) Assignee: Honeywell International Inc., Morristown, NJ (US)

( * ) Notice: Subject to any disclaimer, the term of this patent is extended or adjusted under 35 U.S.C. 154(b) by 861 days.

(21) Appl. No.: 13/160,696

(22) Filed: Jun. 15, 2011

(65) Prior Publication Data

US 2014/0341761 A1 Nov. 20, 2014

(51) Int. Cl.
*F04D 29/56* (2006.01)
*F01D 17/16* (2006.01)
*F02C 6/12* (2006.01)

(52) U.S. Cl.
USPC .......................................................... 415/164

(58) Field of Classification Search
CPC ..... F01D 11/00; F01D 17/165; F04D 29/083; F04D 29/322; F04D 29/323; F04D 29/305; F05D 2240/55; F05D 2240/128
USPC ................................. 415/159, 160, 164, 165
See application file for complete search history.

(56) References Cited

U.S. PATENT DOCUMENTS 2,904,307 A * 9/1959 Balje et al. ...................... 415/95
4,844,690 A * 7/1989 DeLaurier et al. ............ 415/148
6,050,775 A 4/2000 Erdmann et al.
6,371,722 B1 4/2002 Takahashi
6,459,913 B2 10/2002 Cloutier
6,631,363 B1 10/2003 Brown et al.
6,925,805 B2 8/2005 Koch et al.
7,121,788 B2 10/2006 Daudel et al.
7,133,700 B2 11/2006 Benco et al.
7,559,199 B2 * 7/2009 Sausse et al. ................... 60/602
7,918,023 B2 * 4/2011 Sausse et al. ................ 29/889.2

(Continued)

FOREIGN PATENT DOCUMENTS

EP 1 158 141 A2 11/2001
EP 1 120 546 B1 8/2005
WO WO 2004/027218 A1 4/2004
WO WO 2006/018187 A1 2/2006

OTHER PUBLICATIONS

International Search Report for International Application No. PCT/FI2011/050561, mailed Sep. 20, 2011.

*Primary Examiner* — Ned Landrum
*Assistant Examiner* — Brian O Peters
(74) *Attorney, Agent, or Firm* — John C. James

(57) ABSTRACT

A variable-nozzle turbocharger includes a turbine housing and a center housing, and a generally annular nozzle ring and an array of vanes rotatably mounted to the nozzle ring such that the vanes can be pivoted about their axes for regulating exhaust gas flow to the turbine wheel. The vanes extend between the nozzle ring and an opposite wall of the nozzle. An axially floating vane sealing ring is disposed in an annular recess formed in the face of the nozzle ring adjacent proximal ends of the vanes. The vane sealing ring is urged by exhaust gas pressure differential toward the proximal ends of the vanes, and the vanes are thus urged toward the opposite nozzle wall so that distal ends of the vanes are close to or abutting the wall, resulting in a reduction or closing of the gaps at the proximal and distal ends of the vanes.

13 Claims, 4 Drawing Sheets

(56) References Cited

U.S. PATENT DOCUMENTS

| | | | | |
|---|---|---|---|---|
| 2007/0071595 | A1* | 3/2007 | Mukherjee | 415/165 |
| 2007/0180825 | A1 | 8/2007 | Fledersbacher et al. | |
| 2008/0075583 | A1* | 3/2008 | Schlienger et al. | 415/159 |
| 2009/0031340 | A1 | 1/2009 | Modi et al. | |
| 2009/0160643 | A1 | 6/2009 | Lizza | |
| 2009/0253454 | A1 | 10/2009 | Sampson | |
| 2010/0150701 | A1* | 6/2010 | Simon et al. | 415/160 |
| 2011/0003587 | A1 | 1/2011 | Belz et al. | |

* cited by examiner

TURBOCHARGER VARIABLE-NOZZLE ASSEMBLY WITH VANE SEALING RING

BACKGROUND OF THE INVENTION

The present invention relates to turbochargers having a variable-nozzle turbine in which an array of movable vanes is disposed in the nozzle of the turbine for regulating exhaust gas flow into the turbine.

An exhaust gas-driven turbocharger is a device used in conjunction with an internal combustion engine for increasing the power output of the engine by compressing the air that is delivered to the air intake of the engine to be mixed with fuel and burned in the engine. A turbocharger comprises a compressor wheel mounted on one end of a shaft in a compressor housing and a turbine wheel mounted on the other end of the shaft in a turbine housing. Typically the turbine housing is formed separately from the compressor housing, and there is yet another center housing connected between the turbine and compressor housings for containing bearings for the shaft. The turbine housing defines a generally annular chamber that surrounds the turbine wheel and that receives exhaust gas from an engine. The turbine assembly includes a nozzle that leads from the chamber into the turbine wheel. The exhaust gas flows from the chamber through the nozzle to the turbine wheel and the turbine wheel is driven by the exhaust gas. The turbine thus extracts power from the exhaust gas and drives the compressor. The compressor receives ambient air through an inlet of the compressor housing and the air is compressed by the compressor wheel and is then discharged from the housing to the engine air intake.

One of the challenges in boosting engine performance with a turbocharger is achieving a desired amount of engine power output throughout the entire operating range of the engine. It has been found that this objective is often not readily attainable with a fixed-geometry turbocharger, and hence variable-geometry turbochargers have been developed with the objective of providing a greater degree of control over the amount of boost provided by the turbocharger. One type of variable-geometry turbocharger is the variable-nozzle turbocharger (VNT), which includes an array of variable vanes in the turbine nozzle. The vanes are pivotally mounted in the nozzle and are connected to a mechanism that enables the setting angles of the vanes to be varied. Changing the setting angles of the vanes has the effect of changing the effective flow area in the turbine nozzle, and thus the flow of exhaust gas to the turbine wheel can be regulated by controlling the vane positions. In this manner, the power output of the turbine can be regulated, which allows engine power output to be controlled to a greater extent than is generally possible with a fixed-geometry turbocharger.

One such variable-nozzle assembly comprises a generally annular nozzle ring that supports the array of vanes. The vanes are rotatably mounted to the nozzle ring and connected to a rotatable actuator ring such that rotation of the actuator ring rotates the vanes for regulating exhaust gas flow to the turbine wheel. The assembly can also include an insert having a tubular portion sealingly received into the bore of the turbine housing and having a nozzle portion extending generally radially out from one end of the tubular portion, the nozzle portion being axially spaced from the nozzle ring such that the vanes extend between the nozzle ring and the nozzle portion. The nozzle portion of the insert and the nozzle ring can be rigidly connected to each other to maintain a fixed axial spacing between the nozzle portion of the insert and the nozzle ring.

The above-described variable-nozzle assembly is effective, but further improvements are sought.

BRIEF SUMMARY OF THE DISCLOSURE

In particular, an area of potential improvement relates to the sealing between the vanes and the walls of the nozzle formed by the nozzle ring and the nozzle portion of the insert (or by a wall of the turbine housing, in turbochargers that do not employ an insert). Typical variable-nozzle assemblies are constructed such that there are gaps between the ends of the vanes and the adjacent walls of the nozzle so that the vanes are able to pivot without binding on the walls. Reducing the widths of the gaps should result in improved turbine performance because less of the exhaust gas would leak through the gaps. The challenge then becomes how to reduce the sizes of the gaps without impairing the ability of the vanes to pivot.

The present disclosure addresses the above needs and achieves other advantages, by providing a turbocharger having a variable-nozzle assembly, comprising:

a compressor housing and a compressor wheel mounted in the compressor housing and connected to a rotatable shaft, and a turbine housing and a turbine wheel mounted in the turbine housing and connected to the rotatable shaft, the turbine housing defining a chamber surrounding the turbine wheel for receiving exhaust gas from an engine and for supplying the exhaust gas through a nozzle leading from the chamber generally radially inwardly to the turbine wheel;

a center housing connected between the compressor housing and the turbine housing;

a fixedly mounted nozzle ring having opposite first and second faces, the nozzle being defined between the second face and an opposite wall, the second face having an annular recess formed therein, the nozzle ring having a plurality of circumferentially spaced-apart bearing apertures each extending axially from the first face into the recess, and having a plurality of communication orifices each extending from the first face into the recess for providing communication of exhaust gas adjacent the first face into the recess;

a vane sealing ring disposed in a floating manner within the recess in the nozzle ring, the vane sealing ring being substantially flat and sized to substantially fill the recess; and a plurality of vanes disposed in the nozzle and each having a proximal end and a distal end, axles being joined to the proximal ends and being received into the bearing apertures of the nozzle ring and being rotatable in the bearing apertures, the vane sealing ring being adjacent the proximal ends of the vanes, wherein the vane sealing ring has a plurality of openings accommodating the axles of the vanes;

wherein the exhaust gas adjacent the first face of the nozzle ring is substantially stagnated and therefore at a higher pressure than exhaust gas flowing through the nozzle adjacent the second face thereof, the exhaust gas adjacent the first face being communicated through the communication orifices so as to urge the vane sealing ring against the proximal ends of the vanes.

The vane sealing ring, urged against the ends of the vanes by the pressure differential across the ring, thereby reduces or closes any gaps at the proximal ends of the vanes.

Advantageously, the axles of the vanes are disposed in the bearing apertures of the nozzle ring so that the axles can slide axially in the apertures. Accordingly, when the vane sealing ring is urged against the proximal ends of the vanes, the vanes are likewise urged axially so that the distal ends of the vanes are closely adjacent to or abutting the opposite wall of the nozzle, thereby reducing or closing any gaps at the distal ends.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE DRAWINGS

The present inventions now will be described more fully hereinafter with reference to the accompanying drawings in which some but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
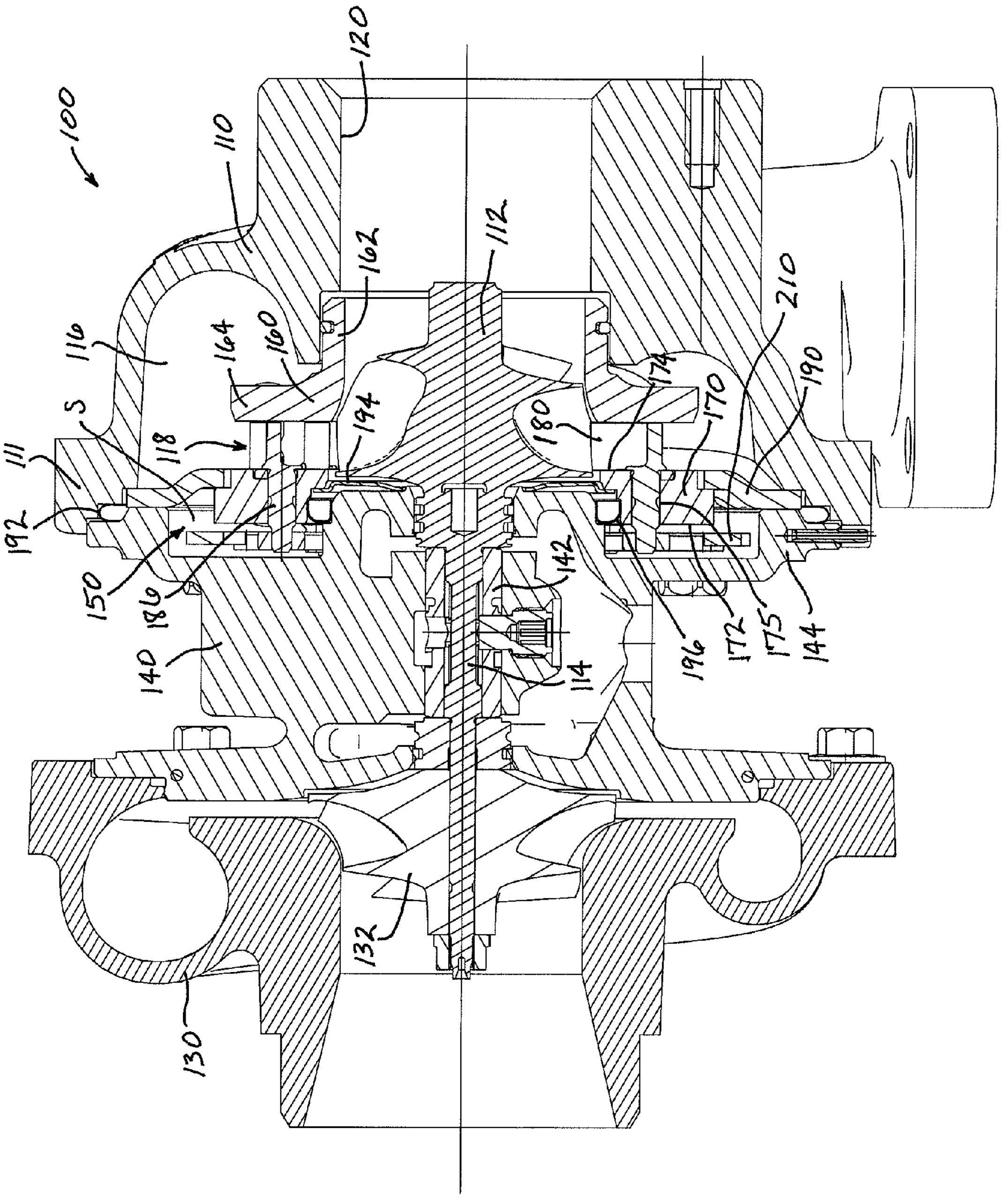
FIG. 1 is a cross-sectional view of a turbocharger having a variable-nozzle assembly in accordance with an embodiment of the invention.

A turbocharger 100 in accordance with one embodiment of the invention is shown in FIG. 1. The turbocharger includes a turbine comprising a turbine housing 110 and a turbine wheel 112 mounted in the turbine housing and connected to a rotatable shaft 114 for rotation therewith. The turbine housing defines a chamber 116 surrounding the turbine wheel for receiving exhaust gas, and there is a nozzle 118 leading from the chamber generally radially inwardly to the turbine wheel. The turbine housing also defines an axially extending bore 120 through which exhaust gas is discharged after passing through the turbine wheel.

The turbocharger further comprises a compressor comprising a compressor housing 130 and a compressor wheel 132 mounted in the compressor housing and connected to the rotatable shaft 114 for rotation therewith. A center housing 140 is connected between the compressor housing 130 and the turbine housing 110. The shaft 114 passes through the center housing, which supports bearings 142 for the shaft.

The turbocharger further comprises a variable-nozzle assembly 150 that includes an insert 160 having a tubular portion 162 received into the bore 120 of the turbine housing and having a generally annular nozzle portion 164 extending generally radially out from one end of the tubular portion. The variable-nozzle assembly 150 also includes a generally annular nozzle ring 170 axially spaced from the nozzle portion 164, and an array of vanes 180 circumferentially spaced about the nozzle ring and rotatably mounted to the nozzle ring such that the vanes are variable in setting angle for regulating exhaust gas flow to the turbine wheel. The nozzle ring 170 is rigidly affixed to the nozzle portion 164, such as by rigid spacers 166 (FIG. 4) that extend between these parts and maintain a fixed spacing between them.

The turbine housing 110 includes a generally ring-shaped flange 111 that opposes a flange 144 of the center housing 140. The turbine housing flange 111 and center housing flange 144 have opposing axially facing surfaces that are stepped such that there is a radially outer pair of opposing surfaces and a radially inner pair of opposing surfaces. A radially outer portion of a generally annular retainer ring 190 is disposed and clamped between the inner pair of opposing surfaces. A resilient sealing ring 192 is disposed and axially compressed between the outer pair of opposing surfaces. In the illustrated embodiment, the sealing ring 192 has a generally U-shaped cross-section oriented such that an open side of the U faces radially inwardly. However, other configurations of sealing ring can be used. A radially inner portion of the retainer ring 190 engages an axially downstream-facing surface of the nozzle ring 170 and thereby limits the extent to which the nozzle ring 170 can move axially in the downstream direction (i.e., to the right in FIG. 1).

A spring element 194, which in the illustrated embodiment also comprises a heat shield, is disposed between a radially inner portion of the nozzle ring 170 and a portion of the center housing 140. The heat shield 194 is a sheet metal part constructed of a resilient metal, and the heat shield has a non-flat configuration such that the heat shield acts as a spring element when axially compressed. The heat shield is generally annular and has a radially outer portion engaged against an axially upstream-facing surface of the nozzle ring 170 and a radially inner portion engaged against an axially downstream-facing surface of the center housing 140. The heat shield is axially compressed between these surfaces.

A resilient radially-compressible locator ring 196 is disposed between a radially inward-facing surface of the nozzle ring 170 and a radially outward-facing surface of the center housing 140 and is engaged against the inward- and outward-facing surfaces so as to radially locate the nozzle ring with respect to the center housing. The locator ring comprises a generally annular body having a generally C-shaped cross-section that defines a radially outer leg and a radially inner leg, the radially outer leg engaged against the radially inward-facing surface of the nozzle ring 170 and the radially inner leg engaged against the radially outward-facing surface of the center housing 140.

Figure 2:
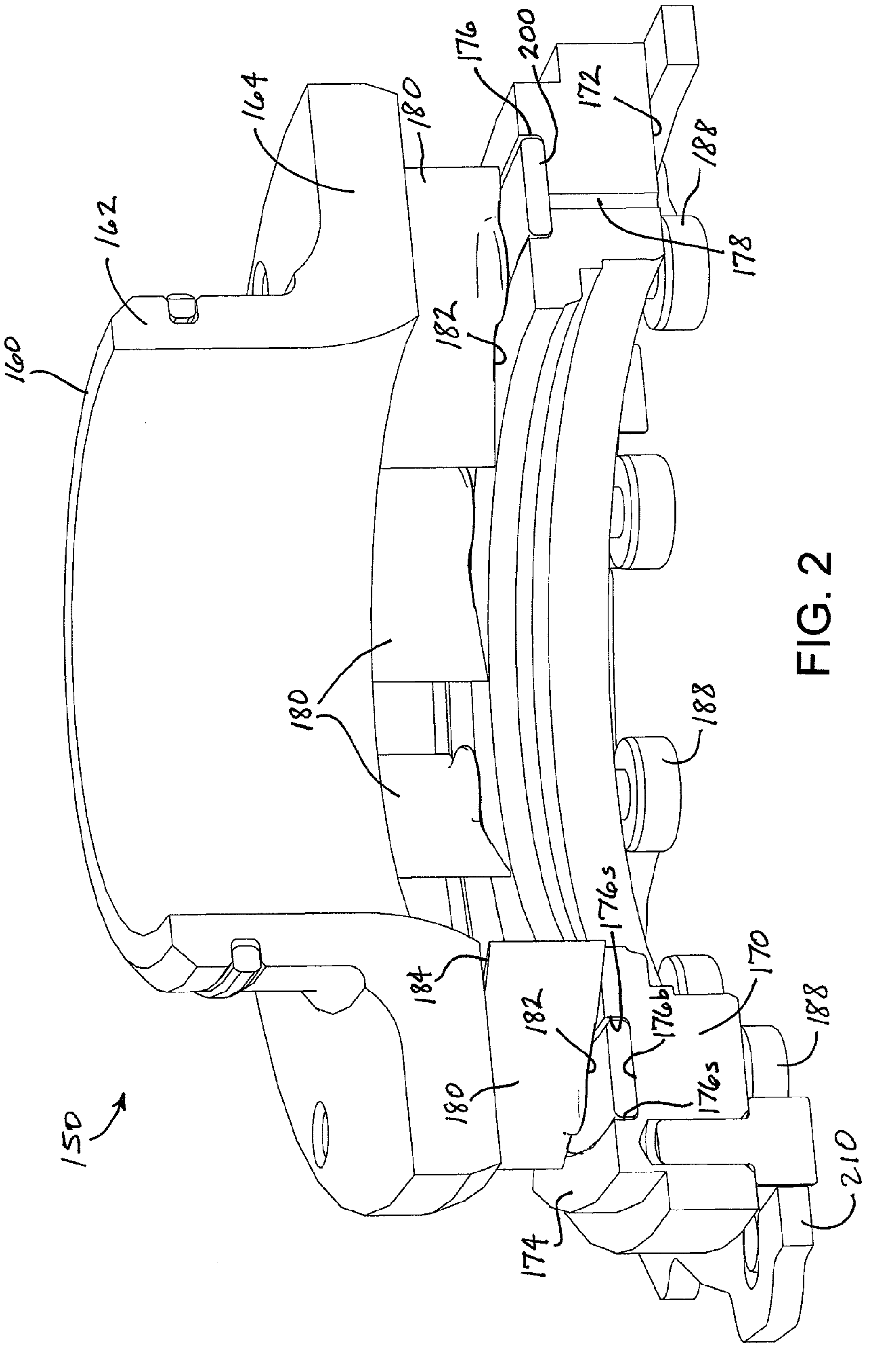
FIG. 2 is a sectioned perspective view of a variable-nozzle assembly in accordance with an embodiment of the invention.
Figure 3:
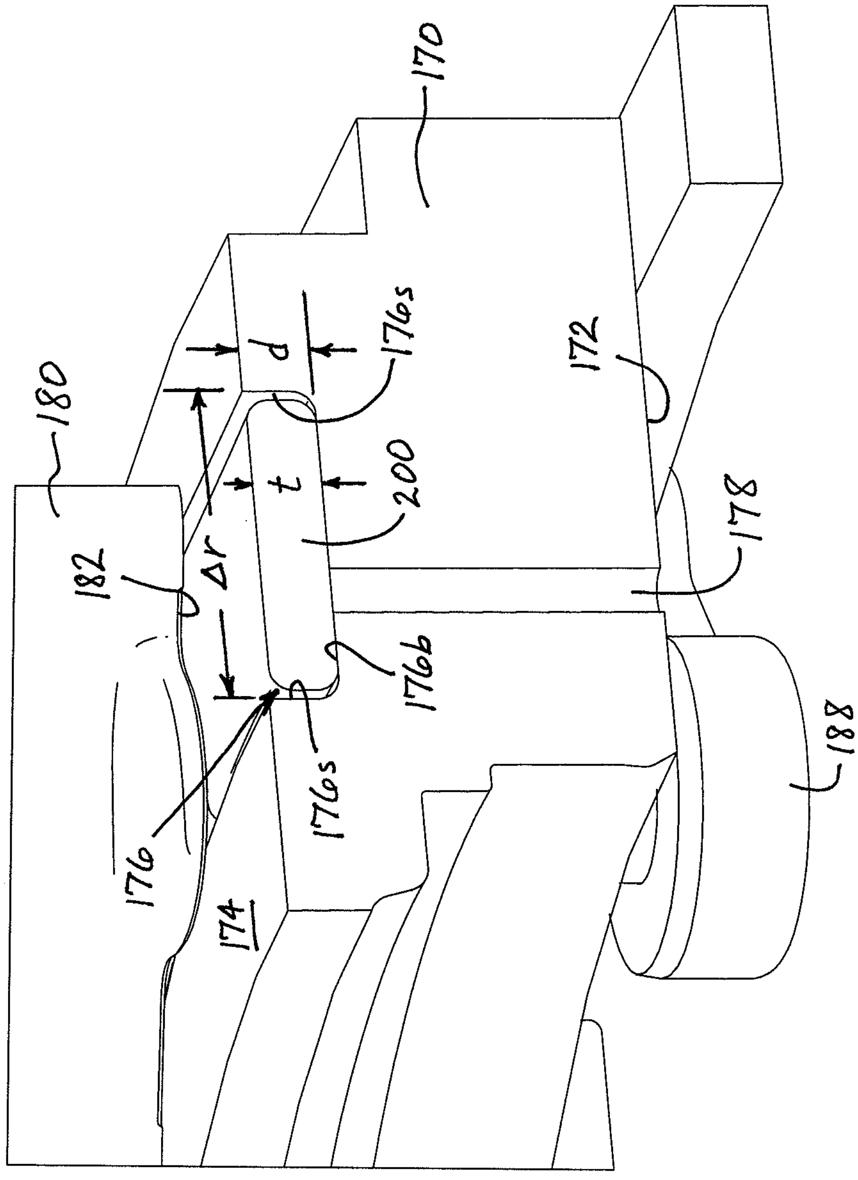
FIG. 3 shows a magnified portion of FIG. 2.
Figure 4:
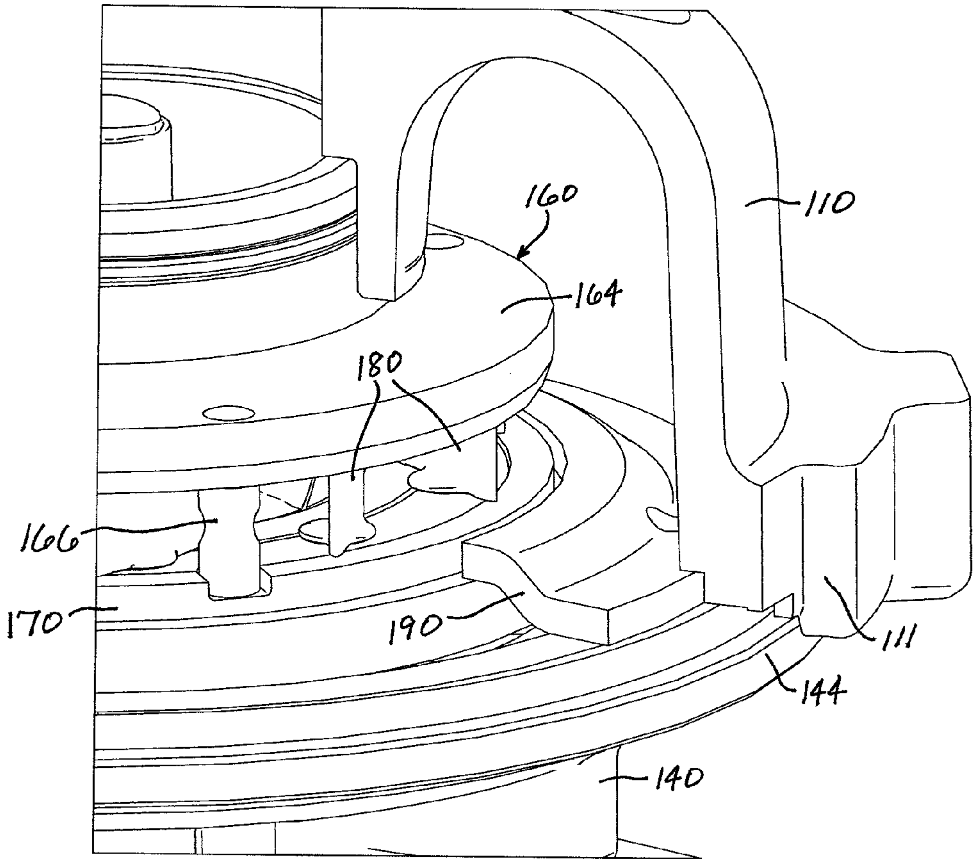
FIG. 4 is a fragmentary perspective view, partly sectioned, of a turbocharger in accordance with an embodiment of the invention.

In accordance with the invention, and with reference to FIGS. 2 through 4, the nozzle ring 170 has a first face 172 and a second face 174. The second face 174 faces axially toward the nozzle portion 164 of the insert 160 and is generally planar except for a recess 176 of annular configuration formed in the second face. The recess 176 has a bottom wall **176*b* and two opposite side walls 176*s*. The bottom wall 176*b* is generally planar and generally parallel to the second face 174 of the nozzle ring, and is spaced axially from the second face 174 by a distance d (referred to as the "depth" d of the recess). The two side walls 176*s* are generally cylindrical, concentric surfaces that are generally perpendicular to the bottom wall 176*b*** and are spaced apart by a radial distance dr.

A vane sealing ring 200 is disposed in the recess 176. The vane sealing ring 200 is a generally flat ring sized to substantially fill the recess 176. That is, the ring 200 has a thickness t that is substantially equal to the depth d of the recess 176 such that the ring 200 and the second face 174 of the nozzle ring are substantially flush with each other. Moreover, the radial extent of the ring 200 is less than the radial distance dr between the side walls **176*s* of the recess by a clearance amount that ensures that the ring 200 can freely move or "float" in the axial direction within the recess. The vanes 180 have proximal ends 182 and opposite distal ends 184. The proximal ends 182 of the vanes are rigidly affixed to axles 186**

Figure 5:
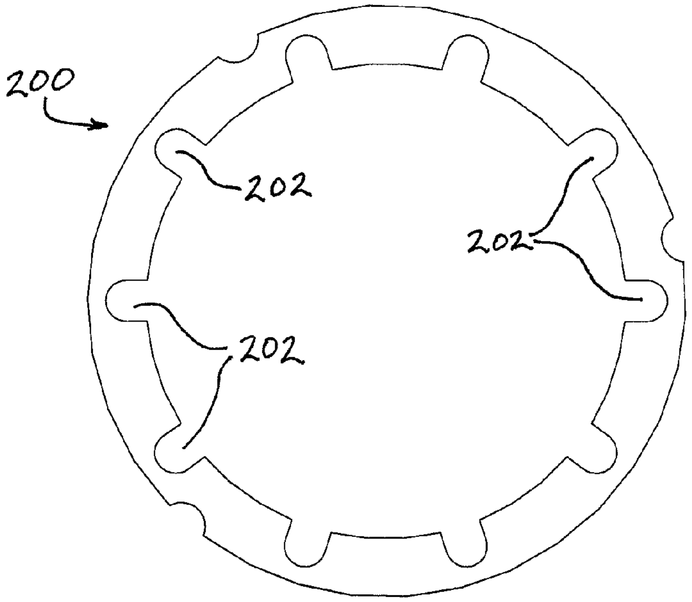
FIG. 5 is a plan view of a vane sealing ring in accordance with an embodiment of the invention.

(FIG. 1) of generally cylindrical form. The nozzle ring 170 includes bearing apertures 175 (FIG. 1) that extend axially through the nozzle ring 170. In the illustrated embodiment the bearing apertures 175 are located such that they extend through the bottom wall 176*b* of the recess. The axles 186 of the vanes pass through the bearing apertures 175 with a loose enough fit to allow the axles to rotate about their axes and also to slide axially within the bearing apertures, but the clearance between the axles and the apertures is small enough to substantially fix the axial orientation of the axes of rotation of the axles. As shown in FIG. 5, the vane sealing ring 200 includes openings 202 that accommodate the axles 186. In the illustrated embodiment, the openings 202 are relief cutouts in the radially inner edge of the ring. Alternatively, the openings could be relief cutouts in the radially outer edge of the ring, or could be holes formed through the ring if the ring had a sufficient radial thickness to allow it.

The axles 186 have distal ends that project out from the bearing apertures 175 beyond the first face 172 of the nozzle ring. Vane arms 188 are rigidly joined to the distal ends of the axles 186. The vane arms have opposite free ends that engage a unison ring 210 disposed adjacent the first faced 172 of the nozzle ring. The unison ring 210 is generally coaxial with the nozzle ring and is rotatable about its axis, actuated by a suitable actuator (not shown). Rotation of the unison ring in one direction causes the vane arms 188 to pivot in a direction that pivots the vanes 180 toward their open position; rotation of the unison ring in the other direction pivots the vanes toward their closed position.

The nozzle ring 170 also has a plurality of communication orifices 178 each extending from the first face 172 into the recess 176 for providing communication of exhaust gas adjacent the first face 172 into the recess. As shown in FIG. 1, there is a space S defined between the first face 172 of the nozzle ring and surfaces of the center housing 140 (and also bounded in part by the retainer ring 190. Exhaust gas is present in the space S because of the virtual impossibility of completely sealing the space, but the exhaust gas in the space is substantially stagnant (i.e., not in motion). Since the total (stagnation) pressure in the space S and the total pressure in the nozzle 118 are essentially equal, it follows that the static pressure of the exhaust gas in the space S is greater than the static pressure of the exhaust gas flowing through the nozzle 118. The recess 176 is in fluid communication with the space S via the communication orifices 178, and is also in fluid communication with the exhaust gas flowing through the nozzle 118. Accordingly, there is a fluid pressure differential from the face of the vane sealing ring 200 that confronts the bottom wall 176*b* of the recess 176 and the opposite face of the vane sealing ring that is substantially flush with the second face 174 of the nozzle ring 170. This fluid pressure differential exerts a force on the vane sealing ring 200 in the axial direction toward the nozzle portion 164 of the insert 160. This causes the vane sealing ring 200 to be urged against the proximal ends 182 of the vanes, thereby reducing or closing any gaps adjacent the proximal ends.

Additionally, because the vane axles 186 are axially slidable in the bearing apertures 175 of the nozzle ring, the sealing ring 200 urges the vanes 180 toward the nozzle portion 164 of the insert 160 so that the distal ends 184 of the vanes are closely adjacent to or abutting the nozzle portion 164, thereby reducing or closing any gaps adjacent the distal ends.

The vane sealing ring 200 advantageously can be made of stainless steel, ceramic, or another material that is tolerant of exposure to high-temperature exhaust gas. When the ring is stainless steel, outer surfaces of the ring can be treated (e.g., by gas nitriding or the like) to reduce friction between the ring and the ends of the vanes 180. Likewise, the surface of the insert 160 that confronts the distal ends 184 of the vanes can be treated to reduce friction.

Tests of a turbocharger constructed substantially in accordance with the foregoing description have indicated that the floating vane sealing ring 200 can significantly improve on-engine turbine efficiency, with the benefit being particularly significant at low engine speeds.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A turbocharger having a variable-nozzle assembly, comprising:

a compressor housing and a compressor wheel mounted in the compressor housing and connected to a rotatable shaft, and a turbine housing and a turbine wheel mounted in the turbine housing and connected to the rotatable shaft, the turbine housing defining a chamber surrounding the turbine wheel for receiving exhaust gas from an engine and for supplying the exhaust gas through a nozzle leading from the chamber generally radially inwardly to the turbine wheel;

a center housing connected between the compressor housing and the turbine housing;

a fixedly mounted nozzle ring having opposite first and second faces, the nozzle being defined between the second face and an opposite wall, the second face having an annular recess formed therein, the nozzle ring having a plurality of circumferentially spaced-apart bearing apertures each extending axially from the first face into the recess, and having a plurality of communication orifices each extending from the first face into the recess for providing communication of exhaust gas adjacent the first face into the recess;

a vane sealing ring disposed in a floating manner within the recess in the nozzle ring, the vane sealing ring being substantially flat and sized to substantially fill the recess; and a plurality of vanes disposed in the nozzle and each having a proximal end and a distal end, axles being joined to the proximal ends and being received into the bearing apertures of the nozzle ring and being rotatable in the bearing apertures, the vane sealing ring being adjacent the proximal ends of the vanes, wherein the vane sealing ring has a plurality of openings accommodating the axles of the vanes;

wherein the exhaust gas adjacent the first face of the nozzle ring is substantially stagnated and therefore at a higher pressure than exhaust gas flowing through the nozzle adjacent the second face thereof, the exhaust gas adjacent the first face being communicated through the communication orifices so as to urge the vane sealing ring against the proximal ends of the vanes.

2. The turbocharger of claim 1, further comprising:

a plurality of vane arms respectively affixed rigidly to the axles, each vane arm having a free end; and a unison ring positioned coaxially with the nozzle ring with a face of the unison ring opposing the first face of the nozzle ring, the unison ring being engaged with the free ends of the vane arms and being rotatable about an axis of the nozzle ring so as to pivot the vane arms, thereby pivoting the vanes in unison.

3. The turbocharger of claim 1, wherein the openings in the vane sealing ring comprise relief cutouts formed in one of a radially outer edge and a radially inner edge of the vane sealing ring.

4. The turbocharger of claim 1, wherein the opposite wall that forms the nozzle with the second face of the nozzle ring comprises a nozzle portion of an insert formed separately from the turbine housing, the insert having a tubular portion joined to the nozzle portion, the tubular portion being received into an axial bore formed in the turbine housing.

5. The turbocharger of claim 4, wherein the axles are axially movable within the bearing apertures such that the vane sealing ring urged against the proximal ends of the vanes causes the distal ends of the vanes to be urged against the nozzle portion of the insert.

6. The turbocharger of claim 4, wherein the nozzle ring is rigidly connected to the nozzle portion of the insert.

7. The turbocharger of claim 6, further comprising a heat shield compressed between the nozzle ring and the center housing, such that the heat shield exerts an axially directed biasing force on the variable-nozzle assembly.

8. The turbocharger of claim 7, further comprising a retainer ring having a radially outer portion engaged against an axially downstream-facing surface of the center housing and a radially inner portion engaged against an axially downstream-facing surface of the nozzle ring, the retainer ring urging the nozzle ring against the biasing force exerted by the heat shield.

9. The turbocharger of claim 7, wherein the heat shield comprises a sheet metal part that is generally annular and has a radially outer portion engaged against an axially upstream-facing surface of the nozzle ring and a radially inner portion engaged against an axially downstream-facing surface of the center housing.

10. The turbocharger of claim 9, further comprising a resilient radially-compressible locator ring disposed between a radially inward-facing surface of the nozzle ring and a radially outward-facing surface of the center housing and engaged against said inward- and outward-facing surfaces so as to radially locate the nozzle ring with respect to the center housing.

11. The turbocharger of claim 10, wherein the locator ring comprises a generally annular body having a generally C-shaped cross-section that defines a radially outer leg and a radially inner leg, the radially outer leg engaged against the radially inward-facing surface of the nozzle ring and the radially inner leg engaged against the radially outward-facing surface of the center housing.

12. A nozzle ring assembly for a variable-nozzle of a turbocharger, the nozzle ring assembly comprising:

a nozzle ring having opposite first and second faces, the second face having an annular recess formed therein, the nozzle ring having a plurality of circumferentially spaced-apart bearing apertures each extending axially from the first face into the recess for accommodating axles of vanes, and having a plurality of communication orifices each extending from the first face into the recess for providing communication of exhaust gas adjacent the first face into the recess; and a vane sealing ring disposed in a floating manner within the recess in the nozzle ring, the vane sealing ring being substantially flat and sized to substantially fill the recess.

13. A variable-nozzle assembly for a turbocharger, comprising:

an insert having a tubular portion adapted for being received in an axial bore of a turbine housing and having a generally annular nozzle portion joined to and extending radially out from one end of the tubular portion;

a nozzle ring fixedly connected to the insert, the nozzle ring having opposite first and second faces, the second face being opposed to the nozzle portion of the insert, the second face having an annular recess formed therein, the nozzle ring having a plurality of circumferentially spaced-apart bearing apertures each extending axially from the first face into the recess, and having a plurality of communication orifices each extending from the first face into the recess for providing communication of exhaust gas adjacent the first face into the recess;

a plurality of vanes each having a proximal end and a distal end, axles being joined to the proximal ends and being received into the bearing apertures of the nozzle ring and being rotatable in the bearing apertures; and a vane sealing ring disposed in a floating manner within the recess in the nozzle ring, the vane sealing ring being substantially flat and sized to substantially fill the recess, the vane sealing ring being adjacent the proximal ends of the vanes, the vane sealing ring having a plurality of openings accommodating the axles of the vanes.

* * * * *